United States Patent [19]

Henry

[11] Patent Number: 4,471,164
[45] Date of Patent: Sep. 11, 1984

[54] STREAM CIPHER OPERATION USING PUBLIC KEY CRYPTOSYSTEM

[75] Inventor: Paul S. Henry, Holmdel, N.J.

[73] Assignee: AT&T Bell Laboratories, Murray Hill, N.J.

[21] Appl. No.: 310,612

[22] Filed: Oct. 13, 1981

[51] Int. Cl.³ .............................................. H04L 9/04
[52] U.S. Cl. .............................. 178/22.11; 178/22.13; 178/22.15
[58] Field of Search .......................... 178/22.10–22.14, 178/22.15

[56] References Cited

U.S. PATENT DOCUMENTS

| 4,200,770 | 4/1980 | Hellman et al. | 178/22.13 |
| 4,218,582 | 8/1980 | Hellman et al. | 178/22.11 |
| 4,316,055 | 2/1982 | Feistel | 178/22.13 |

Primary Examiner—Sal Cangialosi
Attorney, Agent, or Firm—Gregory C. Ranieri

[57] ABSTRACT

In stream cipher operation (FIG. 1), a public key cryptographic system employs a filter (21, 22, 31, 32, 33) to alter each sequence ($S_i$) input to the encryption devices (FIGS. 2 and 3) at the transmitter and the receiver of the system. Characteristics of the filter are known only to the sender and authorized receivers.

13 Claims, 3 Drawing Figures

STREAM CIPHER OPERATION USING PUBLIC KEY CRYPTOSYSTEM

TECHNICAL FIELD

This invention relates to the field of cryptography and, in particular, to public key cryptographic systems.

BACKGROUND OF THE INVENTION

In data transmission networks, it is often necessary to protect stored and transmitted data from intelligent interception by unauthorized parties known as eavesdroppers. Cryptography generally offers the protection necessary for data privacy. However, for stream cipher operation in which incoming data characters are not treated independently, certain types of cryptographic systems afford more privacy than others. For this reason, private key cryptographic systems rather than public key cryptographic systems have been employed for directly generating a private stream cipher.

In stream cipher operation, every incoming data character is enciphered into an output data character on the basis of an internal state of the encryption system. After each character is enciphered with a secret key, the encryption system changes state in accordance with a prescribed criterion. Hence, two occurrences of the same incoming data character generally produce different enciphered output data characters.

Privacy of stream cipher operation resides in the fact that an eavesdropper cannot recover the original incoming data characters from a received set of characters without knowledge of the secret key employed during encryption. If the secret key becomes known, the privacy of the cryptographic system is compromised. Since the encryption process and the encryption key are both publicly known in a public key cryptographic system, privacy is nonexistent when the public key cryptographic system directly generates stream ciphers.

SUMMARY OF THE INVENTION

Privacy in stream cipher operation is achieved with a public key cryptographic system by employing a filter at a transmitter to alter the incoming data characters in a predetermined way. Although the encryption process and the enciphering key are publicly known, characteristics of the filter are known only to the sender and receiver.

At a receiver, decryption is accomplished by filtering the received data characters with a filter having the same characteristics as the filter employed by the sender. Following an encryption of the filtered characters, the received data characters are combined with the enciphered filtered characters to recover the original incoming data characters. Initialization of the filter is usually required prior to performing any decryption.

BRIEF DESCRIPTION OF THE DRAWINGS

A more complete understanding of the invention may be obtained by reading the following description of a specific illustrative embodiment of the invention in conjunction with the appended drawings in which.

DETAILED DESCRIPTION

Figure 1:
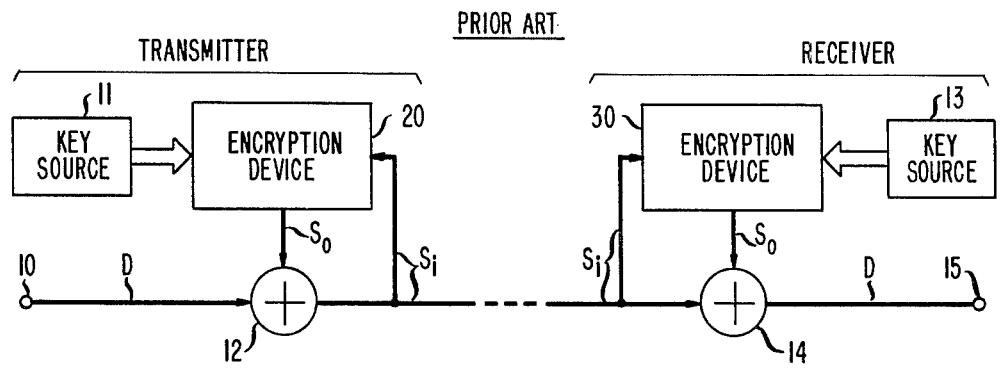
FIG. 1 is a diagram of a cryptographic system for generating and receiving stream ciphers.

FIG. 1 shows a conventional stream cipher cryptography system. For a system description of stream cipher cryptography, see W. Diffie et al., "Privacy and Authentication: An Introduction to Cryptography," Proc. of IEEE, Vol. 67, No. 3, p. 397 et seq., (1979). Each encryption device transforms an input sequence of characters, $S_i$, into a pseudorandom output sequence of characters, $S_o$. Details of the transformation are governed by a secret enciphering key known only to an authorized transmitter and an authorized receiver. Since the input sequence to each encryption device is identical, encryption causes identical output sequences to be generated by the devices at the transmitter and receiver. At the transmitter, output sequence $S_o$ is combined with input data sequence D to yield sequence $S_i$. But at the receiver, output sequence $S_o$ is extracted from input sequence $S_i$ to recover the original data sequence D.

Input data sequence D is supplied from a data source (not shown), such as a teletypewriter or computer, to the transmitter of the cryptographic system via terminal 10. Data sequence D and all other sequences are serial sequences unless expressly noted otherwise. For ease of description, all exemplary sequences are assumed to be binary although other moduli are equally applicable.

Key source 11 contains an enciphering key which is shared by the transmitter and receiver and is kept secret except in the public key cryptosystem. The enciphering key is supplied to encryption device 20 in order to control the enciphering process. Encryption device 20 is usually a private key encryption device such as the Data Encryption Standard (DES) as shown in FIG. 13 of the Diffie et al. reference cited above.

Encryption device 20 utilizes the enciphering key from key source 11 to transform input sequence $S_i$ into an enciphered sequence, output sequence $S_o$. Output sequence $S_o$ is then combined with data sequence D at combining element 12 to generate sequence $S_i$ as a stream cipher sequence for transmission to the receiver. For the binary sequence environment described hereinabove, element 12 is an exclusive OR gate (modulo-2 adder) or similar device. For a sequence of characters from the alphabet, element 12 is a modulo-26 adder, for example.

At the receiver, sequence $S_i$ is enciphered by encryption device 30 using an enciphering key from key source 13. This enciphering key is identical to the key from key source 11. Also, encryption device 30 is identical to encryption device 20 at the transmitter. Since the input sequences to the identical encryption devices are the same, the enciphered output sequences are also the same. Therefore, enciphered sequences $S_o$ is output from encryption device 30.

Sequences $S_i$ and $S_o$ are combined by element 14 to recover original data sequence D. For binary sequences, combining element 14 is a modulo-2 adder. Data sequence D as recovered by the receiver is supplied to the receiver output terminal 15.

Operation of the cryptography system of FIG. 1 is described by mathematical expressions shown below.

At the transmitter, the stream cipher output sequence is represented at the $k^{th}$ time instant as, $$S_{i,k} = S_{o,k} \oplus D_k, \text{ and}$$

$$S_{o,k} = E(S_{i,k-1}),$$

where $\oplus$ represents modulo-2 addition and $E(\bullet)$ is the encryption transformation performed by encryption device 20. At the receiver, the original data sequence D output at terminal 15 is represented at the $k^{th}$ time instant as, $$D_k = S_{o,k} \oplus S_{i,k}, \text{ and}$$

$$S_{o,k} = E(S_{i,k-1}),$$

where $E(\bullet)$ is the encryption transformation performed by encryption device 30.

Figure 2:
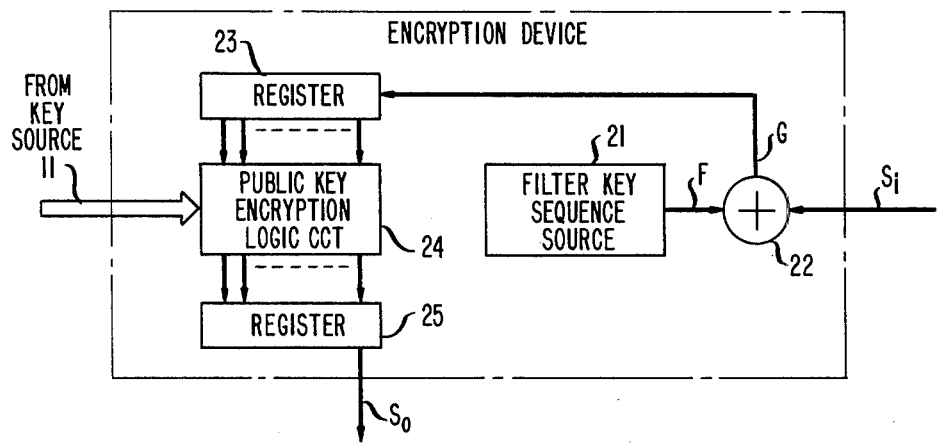
FIG. 2 is a schematic diagram of a public key encryption device for generating stream ciphers, constructed in accordance with the present invention and useful in the system shown in FIG. 1.

FIG. 2 illustrates certain aspects of an encryption device embodying the invention and capable of being substituted for encryption device 20 of FIG. 1. The encryption device shown in FIG. 2 includes a filter key sequence source 21, combining element 22, registers 23 and 25, and public key encryption logic circuit 24. Since circuit 24 performs public key enciphering, it is necessary that key source 11 in FIG. 1 generate a compatible enciphering key and, preferably, a public key.

Filter key sequence source 21 generates filter key sequence F which is known only to the transmitter and receiver. Sequence F is a variable length sequence of random characters. In this example, the length of binary sequence F is selected to be n bits to coincide with the block length of the public key encryption technique employed in circuit 24. Sequence F is usually periodic with a periodicity of not less than n bits.

Several exemplary embodiments are available for generating sequence F. In one embodiment, source 21 includes a recirculating shift register having n stages. Sequence F is initially loaded into the stages of the register prior to transmission. When transmission begins, sequence F is shifted out of the register in synchronism with sequence $S_i$. A feedback path from the register output stage to the register input allows sequence F to recirculate continually through the register.

In a second exemplary embodiment, source 21 includes sufficient logic circuit elements (exclusive OR gates and shift registers) to generate either linear or nonlinear binary sequences. These sequences may be selected from the class of maximum length sequences, Gold code sequences, Barker sequences or the like. See, for example, R. C. Dixon, "Spread Spectrum Systems," (J. Wiley and Sons, Inc. 1976). For this type of embodiment, it is usually necessary to initialize the sequence generator with a small portion of, or seed for, sequence F.

Sequence F is supplied to element 22 where it is combined with input sequence $S_i$ to form filtered sequence G. For binary sequence, combining element 22 is a modulo-2 adder, or an exclusive OR gate. In combination, source 21 and element 22 form a filter to generate filtered sequence G by altering input sequence $S_i$ in a predetermined manner.

Register 23 is a buffer element for storing a predetermined number of sequential characters of sequence G which are input serially. After the predetermined number of characters have been stored, register 23 outputs the stored characters in parallel to public key encryption logic circuit 24. In an example from experimental practice, register 23 is an n stage shift register with a capability for accepting a serial input sequence and for providing a block of n parallel outputs, one output per shift register stage.

Public key encryption logic circuit 24 enciphers the block of output characters from register 23 by employing the public enciphering key from source 11. Circuit 24 generates m outputs in a block, where m is an integer greater than or equal to the integer n based upon the type of public key encryption method employed. During transmission of enciphered messages occurring after a brief period of receiver initialization, selected parallel outputs from circuit 24 in excess of n may be ignored in order to preserve equality and timing synchronization between the lengths of blocks at the input and output of circuit 24. Receiver initialization is accomplished by transmitting an enciphered version of filter key sequence F in its entirety. That is, each of the m outputs from circuit 24 must be transmitted in order to ensure that the receiver properly acquires filter key sequence F. During receiver initialization, only the n selected parallel outputs of the m outputs from circuit 24 are fed back to combining element 22 for filtering.

Public key encryption logic circuit 24 may embody any of the known public key encryption methods such as RSA public key cryptography and trapdoor knapsack public key cryptography or the like. For example, a trapdoor knapsack public key encryption circuit applicable to the realization of circuit 24 is shown in U.S. Pat. No. 4,218,582 issued to M. Hellman et al. on Aug. 19, 1980.

Parallel outputs from circuit 24 are stored in register 25. Register 25 restores the parallel outputs into a serial sequence of characters as output sequence $S_o$. An n-stage parallel-input, serial-output shift register is capable of performing the functions of register 25 when the sequence $S_o$ is binary.

Figure 3:
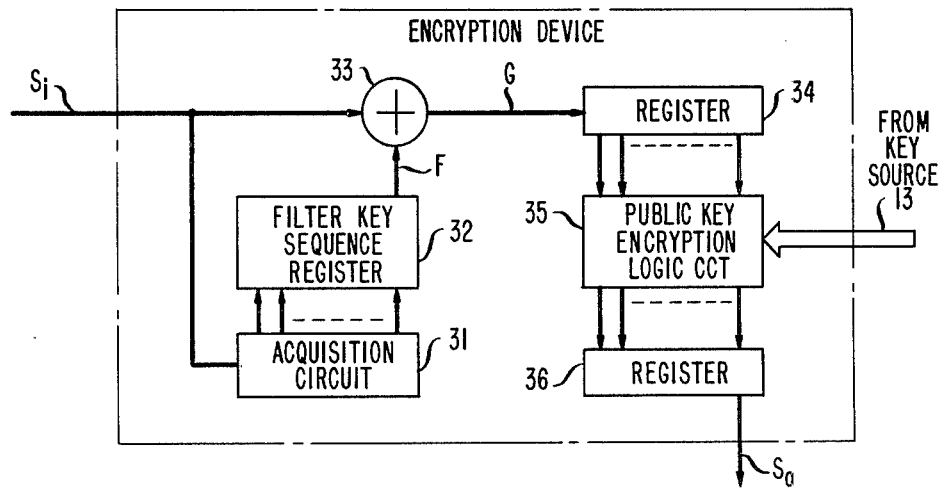
FIG. 3 is a schematic diagram of a public key encryption device for deciphering stream ciphers, constructed in accordance with the present invention and useful in the system shown in FIG. 1.

FIG. 3 illustrates certain aspects of an encryption device embodying the invention and capable of being substituted for encryption device 30 in FIG. 1. The encryption device shown in FIG. 3 includes acquisition circuit 31, filter key sequence register 32, combining element 33, registers 34 and 36, and public key encryption logic circuit 35. Since circuit 35 performs public key enciphering, it is necessary that key source 13 in FIG. 1 generate a compatible enciphering key which is preferably a public key.

Acquisition circuit 31 and register 32 combine to recover filter key sequence F from input sequence $S_i$. Acquisition circuit 31 includes those logic elements necessary to perform public key decryption of sequence $S_i$ in accordance with the method of public key encryption utilized by encryption logic circuit 24 of FIG. 2. In the example recited above, a trapdoor knapsack public key decryption circuit as described in the M. Hellman patent is applicable to the realization acquisition circuit 31.

Acquisition entails either recovery of sequence F in toto or recovery of a seed sequence which is loaded into register 32 and which, in turn, causes register 32 to generate sequence F. As stated above, the output of circuit 31 is loaded into register 32.

Filter key sequence register 32 is a buffer element, such as a feedback shift register for recirculating the filter key sequence or a shift register and associated logic elements for generating a maximum length sequence or the like, of sufficient size to accommodate the output of circuit 31. For operational efficiency, register 32 is preferably a parallel-input, serial output type of shift register. Once acquisition of sequence F or its seed is completed by circuit 31, register 32 initiates serial output of sequence F to combining element 33. Sequence F as output from register 32 is an exact replica of sequence F generated by register 21.

Combining element 33 generates filtered sequence G at the receiver by mod-2 combining filter key sequence F with input sequence $S_i$. In combination, element 33 and register 32 with acquisition circuit 31 form a filter which generates filtered sequence G by altering input sequence $S_i$ in a predetermined manner. It is apparent that this filter performs in the same fashion as the filter in the transmitter formed by filter key sequence source 21 and combining element 22.

Register 34 accepts sequence G serially from combining element 33. Register 34 is a buffer element which stores a predetermined number of sequential characters of sequence G. After the predetermined number of characters have been stored, register 34 outputs the stored characters in parallel to public key encryption logic circuit 35. In an example from experimental practice, register 34 is an n-stage shift register with a capability for accepting a serial input sequence and for providing a block of n parallel outputs.

Public key encryption logic circuit 35 enciphers the block of output characters from register 34 by employing the public enciphering key from source 13. Circuit 35 generates a block of n-parallel outputs. In order to maintain equality between the block lengths of the input to and output from logic circuit 35, selected parallel outputs in excess of n are ignored for certain public key encryption methods. Public key encryption logic circuit 35 may embody any of the known public key encryption methods such as RSA public key cryptography and trapdoor knapsack public key cryptography, for example, as described with reference to circuit 24 above. Although encryption circuits 24 and 35 need not be identical, circuits 24 and 35 are constrained to perform the same enciphering function.

Parallel outputs from circuit 35 are stored in register 36. Register 36 restores the parallel outputs into a serial sequence of characters as output sequence $S_o$. An n-stage parallel-input, serial-output shift register is capable of performing the functions of register 36 when the sequence $S_o$ is binary.

A set of equations is given below to describe binary sequence operation of the cryptographic system shown in FIG. 1 in which the transmitter incorporates the encryption device shown in FIG. 2 and the receiver incorporates the encryption device shown in FIG. 3. At the transmitter, $$G_k = F \oplus S_{i,k},$$

$$S_{o,k} = E(G_{k-1}), \text{ and}$$

$$S_{i,k} = S_{o,k} \oplus D_k,$$

where $E(\bullet)$ is the public key encryption function and $\oplus$ is modulo-2 addition.

At the receiver, $$G_k = F \oplus S_{i,k},$$

$$S_{o,k} = E(G_{k-1})$$

$$D_k = S_{i,k} \oplus S_{o,k}.$$

AN EXAMPLE

In order to more fully understand the operation of the invention as embodied in the Figures, an example is set forth below in which the public key encryption method employed in circuits 24 and 35 alike is an RSA public key encryption technique. For a description of the RSA encryption technique, see the Diffie et al. reference at pages 412–413. Also, see R. Rivest et al. "A Method for Obtaining Signatures and Public Key Cryptosystems," Communications of ACM, Vol. 21, pp. 120–126 (1978).

In this example, the receiver selects two secret prime numbers, P and Q, at random. A product formed by P and Q is designated N which is made public at least to the transmitter. The receiver computes the Euler totient function $$\Phi(N) = (P-1)(Q-1)$$

to calculate the number of integers less than and relatively prime to N. Then, the receiver chooses a number X, which is made public, in the range 2 to $\Phi(N) - 1$.

Filtered sequence G is divided into a series of blocks (groups of bits) $G_0, G_1, \ldots G_i$ represented by integers in the interval 0 to $N-1$. Enciphering of sequence G is accomplished block-by-block using the public information X and N as follows:

$$S_{o,k} = G_{k-1}^X \text{ modulo } N.$$

By using $\Phi(N)$, the receiver calculates a number Y such that $$X \cdot Y = 1 \text{ modulo } \Phi(N).$$

Hence, deciphering is performed in acquisition circuit 31 by raising a block of sequence $S_i$ to the $Y^{th}$ power as,
$$F = S_i^Y \text{ modulo } N$$

This operation is generally applied only to the preamble of sequence $S_i$. The preamble is defined as input sequence block $S_{i,1}$. For the following relations at the transmitter, $$D_k = 0, \text{ for all } k \leq 1, \text{ and}$$

$$S_{i,k} = 0, \text{ for all } k \leq 0,$$

ps it can be seen that, $$G_o = F \oplus S_{i,0} = F$$

and the preamble is $$S_{o,1} = E(G_o) = G_o^X \text{ mod } N = F^X \text{ mod } N.$$

Furthermore, $$S_{i,1} = S_{o,1} \oplus D_1 = S_{o,1}.$$

Deciphering of input sequence preamble $S_{i,1}$ in acquisition circuit 31 is then carried out by raising sequence $S_{i,1}$ to the $Y^{th}$ power as $$S_{i,1}^Y = F^{XY} \text{ modulo } N$$

$$S_{i,1}^Y = F \text{ modulo } N = F, \text{ for } F < N.$$

Thus, deciphering of sequence $S_{i,1}$ yields filter key sequence F.

As a small example, the receiver chooses P=7 and Q=13 such that N=PQ=91 and Φ(N)=72. Furthermore, the receiver selects X=5 and Y is calculated to be 29. The filter key sequence is chosen to be integer 23 which is written in binary as (0010111). Sequence $S_o$ then exhibits the following preamble, $$S_{o,1} = F^X \text{ modulo } N = 23^5 \text{ modulo } 91$$

$$S_{o,1} = 4 \text{ or } (0000100)_2 = S_{i,1}.$$

To decipher the preamble, acquisition circuit 31 performs the RSA descryption operation described above as follows, $$\begin{aligned}
S_i^y \text{ modulo } N &= 4^{29} \text{ modulo } 91 \\
&= 4^{16}\, 4^8\, 4^4\, 4^1 \text{ modulo } 91 \\
&= 74 \cdot 16 \cdot 74 \cdot 4 \text{ modulo } 91 \\
&= 23 \text{ modulo } 91 = F
\end{aligned}$$

The table below illustrates encryption of a short data sequence at the transmitter.

| BLOCK NUMBER k | OUTPUT SEQUENCE $S_{o,k}$ | DATA SEQUENCE $D_k$ | INPUT SEQUENCE $S_{i,k}$ | FILTERED SEQUENCE $G_k$ |
|---|---|---|---|---|
| 0 | 0<br>0000000 | 0<br>0000000 | 0<br>0000000 | 23<br>0010111 |
| 1 | 4<br>0000100 | 0<br>0000000 | 4<br>0000100 | 19<br>0010011 |
| 2 | 30<br>1010000 | 85<br>1010101 | 5<br>0000101 | 18<br>0010010 |
| 3 | 44<br>0101100 | 112<br>1110000 | 92<br>1011100 | 75<br>1001011 |
| 4 | 17<br>0010001 | 0<br>0000000 | 17<br>0010001 | ... |

In the table above, the sequences are represented in an integer format as well as binary format.

The following table illustrates recovery of the short enciphered data sequence at the receiver in accordance with the invention.

| BLOCK NUMBER k | INPUT SEQUENCE $S_{i,k}$ | FILTERED SEQUENCE $G_k$ | OUTPUT SEQUENCE $S_{o,k}$ | DATA SEQUENCE $D_k$ |
|---|---|---|---|---|
| 1 | 4<br>0000100 | 19<br>0010011 | 0<br>0000000 | — |
| 2 | 5<br>0000101 | 18<br>0010010 | 80<br>1010000 | 85<br>1010101 |
| 3 | 92<br>1011100 | 75<br>1001011 | 44<br>0101100 | 112<br>1110000 |
| 4 | 17<br>001001 | — | 17<br>0010001 | 0<br>0000000 |

What is claimed is:

1. Cryptographic apparatus for generating a stream cipher sequence ($S_i$) from an input data sequence (D) including a source (11) of an enciphering key, encryption means (20) jointly responsive to the stream cipher sequence and the enciphering key for generating an output sequence ($S_0$), and means for combining the input data sequence and the output sequence to generate the stream cipher sequence, the encryption means being characterized by means (21, 22) for filtering the stream cipher sequence to generate a filtered sequence (G) by combining the stream cipher sequence with a sequence of random characters (F), and public key encryption means (23, 24, 25) using the enciphering key for transforming the filtered sequence into the output sequence.

2. Apparatus as defined in claim 1 wherein the filtering means includes, a source (21) of the sequence of random characters (F), and means (22) for combining the stream cipher sequence with the sequence of random characters to generate the filtered sequence.

3. Apparatus as defined in claim 2 wherein the sequence of random characters is periodic.

4. Apparatus as defined in claim 1 wherein the public key encryption means includes first means (23) for storing a predetermined length of the filtered sequence, public key encryption logic circuit (24) for transforming the sequence stored in the first storing means using the enciphering key into a predetermined length of the output sequence, and second means (25) for storing the predetermined length of the output sequence to generate serially the output sequence.

5. Apparatus as defined in claim 4 wherein the predetermined length of the filtered sequence is equal to the predetermined length of the output sequence.

6. Cryptographic apparatus for generating a stream cipher sequence ($S_i$) from an input data sequence (D) including a source (11) of an enciphering key, encryption means (20) jointly responsive to the stream cipher sequence and the enciphering key for generating an output sequence ($S_0$), and means for combining the input data sequence and the output sequence to generate the stream cipher sequence, the encryption means being characterized by, a source (21) of a periodic sequence of random characters (F), means (22) for combining the stream cipher sequence with the sequence of random characters to generate a filtered sequence, first means (23) for storing a predetermined length of the filtered sequence, public key encryption logic circuit (24) using the enciphering key for transforming an output from the first storing means into a predetermined length of the output sequence, and second means (25) for storing the predetermined length of the output sequence to generate serially the output sequence.

7. Apparatus as defined in claim 6 wherein the predetermined length of the filtered sequence is equal to the predetermined length of the output sequence.

8. Cryptographic apparatus for generating a data sequence (D) from a stream cipher sequence ($S_1$) including a source (13) of an enciphering key, encryption means (30) jointly responsive to the stream cipher sequence and the enciphering key for generating an output sequence ($S_0$), means (14) for combining the stream cipher sequence and the output sequence to generate the data sequence, the encryption means being characterized by, means (31, 32, 33) for filtering the stream cipher sequence to generate a filtered sequence (G) by combining the stream cipher sequence with a sequence of random characters (F), and public key encryption means (34, 35, 36) using the enciphering key for transforming the filtered sequence into the output sequence.

9. Apparatus as defined in claim 8 wherein the filtering means includes,
   a source (31, 32) of the sequence of random characters (F), and
   means (33) for combining the stream cipher sequence with the sequence of random characters to generate the filtered sequence.

10. Apparatus as defined in claim 9 wherein the sequence of random characters source includes
    acquisition means (31) for generating a predetermined length of a sequence from the stream cipher sequence, and
    means (32) responsive to the predetermined length of the sequence from the acquisition means for generating serially the sequence of random characters.

11. Apparatus as defined in claim 8 or claim 10 wherein the public key encryption means includes
    first means (34) for storing a predetermined length of the filtered sequence,
    public key encryption logic circuit (35) for transforming an output from the first storing means using the enciphering key into a predetermined length of the output sequence, and
    second means (36) for storing the predetermined length of the output sequence to generate serially the output sequence.

12. Apparatus as defined in claim 11 wherein the predetermined length of the filtered sequence is equal to the predetermined length of the output sequence.

13. A cryptographic system comprising transmitter cryptographic apparatus and receiver cryptographic apparatus, the transmitter cryptographic apparatus being adapted for generating a stream cipher sequence ($S_i$) from an input data sequence (D) including a first source (11) of an enciphering key, first encryption means (20) jointly responsive to the stream cipher sequence and the enciphering key for generating a first output sequence ($S_0$), and means for combining the input data sequence and the first output sequence to generate the stream cipher sequence, the receiver cryptographic apparatus being adapted for generating the data sequence (D) from the stream cipher sequence ($S_i$) including a second source (13) of the enciphering key, second encryption means (30) jointly responsive to the stream cipher sequence and the enciphering key for generating a second output sequence ($S_0$), and means (14) for combining the stream cipher sequence and the second output sequence to generate the data sequence, the system characterized in THAT the transmitter cryptographic apparatus further includes,
    a source (21) of a periodic sequence of random characters (F),
    means (22) for combining the stream cipher sequence with the sequence of random characters to generate a filtered sequence,
    first means (23) for storing a predetermined length of the filtered sequence,
    public key encryption logic circuit (24) using the enciphering key for transforming an output from the first storing means into a predetermined length of the first output sequence, and
    second means (25) for storing the predetermined length of the first output sequence to generate serially the first output sequence, and the receiver cryptographic apparatus further includes,
    acquisition means (31) for generating a predetermined length of a sequence from the stream cipher sequence,
    means (32) responsive to the predetermined length of the sequence from the acquisition means for generating serially the sequence of random characters,
    means (33) for combining the stream cipher sequence with the sequence of random characters to generate the filtered sequence
    third means (34) for storing a predetermined length of the filtered sequence,
    public key encryption logic circuit (35) using the enciphering key for transforming an output from the third storing means into a predetermined length of the second output sequence, and
    fourth means (36) for storing the predetermined length of the second output sequence to generate serially the second output sequence.

* * * * *